United States Patent
Odgaard et al.

(10) Patent No.: US 11,867,153 B2
(45) Date of Patent: *Jan. 9, 2024

(54) METHOD AND DEVICE FOR CONTROLLING OUTPUT POWER OF A WIND TURBINE

(71) Applicant: BEIJING GOLDWIND SCIENCE & CREATION WINDPOWER EQUIPMENT CO., LTD., Beijing (CN)

(72) Inventors: Peter Fogh Odgaard, Hinnerup (DK); Mengting Yu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 97 days.

This patent is subject to a terminal disclaimer.

(21) Appl. No.: 17/460,845

(22) Filed: Aug. 30, 2021

(65) Prior Publication Data

US 2021/0388813 A1 Dec. 16, 2021

Related U.S. Application Data

(63) Continuation of application No. 16/085,559, filed as application No. PCT/CN2017/118981 on Dec. 27, 2017, now Pat. No. 11,105,315.

(30) Foreign Application Priority Data

Jul. 18, 2017 (CN) .......................... 201710584766.2

(51) Int. Cl.
F03D 7/02 (2006.01)

(52) U.S. Cl.
CPC ........ *F03D 7/028* (2013.01); *F05B 2260/821* (2013.01); *F05B 2270/1033* (2013.01); *F05B 2270/327* (2013.01)

(58) Field of Classification Search
CPC ................ F03D 7/028; F05B 2260/821; F05B 2270/1033; F05B 2270/327
See application file for complete search history.

(56) References Cited

U.S. PATENT DOCUMENTS

| | | |
|---|---|---|
| 5,172,784 A | 12/1992 | Varela |
| 6,703,718 B2 | 3/2004 | Calley et al. |

(Continued)

FOREIGN PATENT DOCUMENTS

| | | |
|---|---|---|
| CN | 102242689 A | 11/2011 |
| CN | 103867387 A | 6/2014 |

(Continued)

OTHER PUBLICATIONS

SIPO International Search Report and Written Opinion issued in corresponding PCT Application No. PCT/CN2017/118981, dated Apr. 24, 2018, 11 pages.

(Continued)

*Primary Examiner* — Tulsidas C Patel
*Assistant Examiner* — Thomas K Quigley
(74) *Attorney, Agent, or Firm* — Bayes PLLC

(57) ABSTRACT

A method and device for controlling output power in a primary frequency modulation process of a wind turbine are provided by the present disclosure. The method includes predicting a rotational speed of the wind turbine; determining frequency modulation remaining time based on the predicted rotational speed, the frequency modulation remaining time being time for which the wind turbine is able to continue to output frequency modulation power as the output power used for the primary frequency modulation (Continued)

without affecting a recovery of the wind turbine after the primary frequency modulation; controlling the output power based on the determined frequency modulation remaining time.

20 Claims, 2 Drawing Sheets

(56) References Cited

U.S. PATENT DOCUMENTS

| | | | |
|---|---|---|---|
| 10,731,632 B2 | 8/2020 | Hovgaard et al. | |
| 2013/0038060 A1 | 2/2013 | Odgaard et al. | |
| 2013/0134708 A1 | 5/2013 | Hamano | |
| 2013/0328317 A1 | 12/2013 | Himmelmann | |
| 2014/0159367 A1 | 6/2014 | Yin | |
| 2016/0040653 A1 | 2/2016 | Kang et al. | |
| 2017/0054203 A1 | 2/2017 | Merricks et al. | |
| 2018/0266392 A1 | 9/2018 | Hovgaard et al. | |
| 2019/0178942 A1 | 6/2019 | Tabuchi et al. | |

FOREIGN PATENT DOCUMENTS

| | | |
|---|---|---|
| CN | 105045229 A | 11/2015 |
| CN | 105134485 A | 12/2015 |
| CN | 106286128 A | 1/2017 |
| CN | 106528912 A | 3/2017 |
| CN | 106532746 A | 3/2017 |
| CN | 107152377 A | 9/2017 |
| EP | 3076014 A1 | 5/2016 |
| JP | 2016188612 A | 11/2016 |
| KR | 20130083392 A | 7/2013 |
| MX | 2013010761 A | 4/2014 |
| WO | 2013188017 A1 | 12/2013 |
| WO | 2015121609 A1 | 8/2015 |

OTHER PUBLICATIONS

First Office action issued in corresponding Chinese Application No. 201710584766.2, dated Nov. 1, 2018, 11 pages.

Supplemental European Search Report issued in corresponding European Application No. EP 17 90 0282.9, dated Apr. 10, 2019, 8 pages.

Baccino, Francesco et al, "An Optimal Model-Based Control Technique to Improve Wind Farm Participation to Frequency Regulation," IEEE Transaction on Sustainable Energy, vol. 6, No. 3, Jul. 2015, 12 pages.

El Itani, Samer et al, "Short-Term Frequency Support Utilizing Inertial Response of DFIG Wind Turbines," Power and Energy Society General Meeting, 2011 IEEE, 8 pages.

Examination Report issued in corresponding Indian Application No. 201817036136, dated Nov. 20, 2020, 5 pages.

METHOD AND DEVICE FOR CONTROLLING OUTPUT POWER OF A WIND TURBINE

CROSS-REFERENCE TO RELATED APPLICATIONS

The present disclosure is a continuation of U.S. patent application Ser. No. 16/085,559, filed on Sep. 14, 2018 (now U.S. Pat. No. 11,105,315), which is a national phase of International Application No. PCT/CN2017/118981, filed on Dec. 27, 2017, which claims priority to Chinese Patent Application No. 201710584766.2, filed on Jul. 18, 2017, all of which are incorporated herein by reference in their entireties.

TECHNICAL FIELD

The present disclosure relates to the field of wind power generation, particularly to a method and a device for controlling output power in a primary frequency modulation process of a wind turbine.

BACKGROUND

As a clean renewable resource, wind energy is being paid more and more attention. An installed capacity of the wind turbine is also increasing. The wind turbine can convert kinetic energy of wind into mechanical kinetic energy, and then convert the mechanical energy into electrical energy. In the primary frequency modulation process of the wind turbine, the output power of the wind turbine needs to be boosted for a specified duration. After the primary frequency modulation, the wind turbine needs to recover rotor's kinetic energy which is released during the primary frequency modulation to an original level, and store the rotor's kinetic energy again, which result in a decline in power. If the wind speed suddenly drops during the primary frequency modulation, it means more kinetic energy of the rotor needs to be released to boost the output power, to ensure the specified duration, which may result in a sharp decline of the output power of the wind turbine during a recovery period after the primary frequency modulation.

SUMMARY

A method for controlling output power in a primary frequency modulation process of a wind turbine is provided according to an aspect of the present disclosure. The method includes predicting a rotational speed of the wind turbine; determining frequency modulation remaining time based on the predicted rotational speed, the frequency modulation remaining time being time for which the wind turbine is able to continue to output frequency modulation power as the output power used for the primary frequency modulation without affecting a recovery of the wind turbine after the primary frequency modulation; and controlling the output power based on the determined frequency modulation remaining time.

A device for controlling output power in a primary frequency modulation process of a wind turbine is provided according to an aspect of the present disclosure. The device includes a rotational speed prediction unit configured to predict a rotational speed of the wind turbine; a remaining time prediction unit configured to determine frequency modulation remaining time based on the predicted rotational speed, the frequency modulation remaining time being time for which the wind turbine is able to continue to output frequency modulation power as the output power used for the primary frequency modulation without affecting recovery of the wind turbine after the primary frequency modulation; and a control unit configured to control the output power based on the determined frequency modulation remaining time.

A control system in a wind turbine is provided according to an aspect of the present disclosure. The control system includes a processor and a memory storing a computer program that, when executed by the processor, causes the method described above to be performed.

A computer readable storage medium storing a computer program is provided according to an aspect of the present disclosure. The computer program, when executed by the processor, causes the method described above to be performed.

The method and device for controlling output power in a primary frequency modulation process of a wind turbine according to embodiments of the present disclosure dynamically adjust the output power of the primary frequency modulation, such that the output power of the wind turbine can be boosted during the whole primary frequency modulation process. At the same time, a problem of excessive decline of the output power caused by restoring the kinetic energy of the rotor during the recovery period of the wind turbine after completing the primary frequency modulation is avoid.

Part of other aspects and/or advantages will be described hereinafter, the other aspects and/or advantages will be clear according to the description, or can be known by implementations of the present disclosure.

BRIEF DESCRIPTION OF THE DRAWINGS

The above and other objects, characteristics and advantages will be more clear according to following detailed descriptions in conjunction with drawings, wherein.

DETAILED DESCRIPTION

Figure 1:
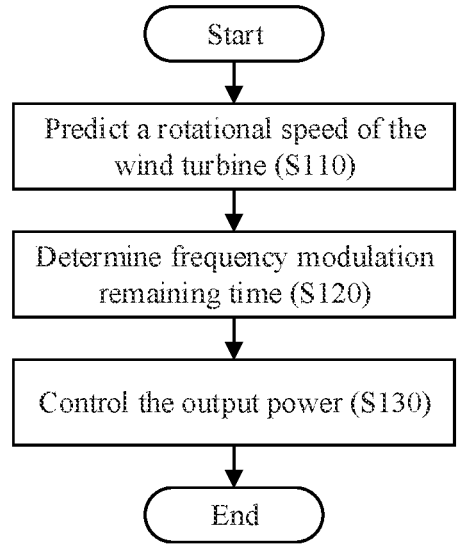
FIG. 1 is a flowchart of a method for controlling output power in a primary frequency modulation process of a wind turbine according to an embodiment of the present disclosure.

Exemplary embodiments of the present disclosure are fully described hereinafter in conjunction with drawings, and some of the exemplary embodiments are illustrated in the drawings.

In a frequency modulation process of a wind turbine, when there is a need to boost output power, the frequency modulation power for the primary frequency modulation is determined as the output power. When the wind turbine outputs the frequency modulation power, the frequency modulation power can be controlled by the method of the present disclosure.

FIG. 1 is a flowchart of a method for controlling output power in a primary frequency modulation process of a wind turbine according to an embodiment of the present disclosure.

In step S110, a rotational speed of the wind turbine is predicted.

In an embodiment of the present disclosure, a next rotational speed of the wind turbine at a next moment is predicted by using a rotational speed of the wind turbine at a current moment and a frequency modulation power at the current moment iteratively. The next moment is separated from the current moment by a predetermined time step. That is to say, rotational speeds at moments separated by a predetermined time step are predicted. Two moments corresponding to two adjacent predicted rotational speeds are separated by the predetermined time step. For a situation of predicting rotational speeds of two adjacent moments, the two moments are separated by the predetermined time step. For example, in two adjacent predictions of rotational speeds, the rotational speed ω(n) at the current moment T(n) and the rotational speed ω(n+1) at the next moment T(n+1) are predicted. T(n+1)–T(n) is Ts (Ts is the predetermined time step). Therefore, the predicted rotational speed can be used to continue predicting its next rotational speed.

In an embodiment of the present disclosure, a next rotational speed after the predetermined time step can be predicted based on the rotational speed at the current moment, the aerodynamic mechanical torque at the current moment, the electromagnetic torque of the generator at the current moment related to the frequency modulation power at the current moment, the predetermined time step, and the moment of inertia of the rotor. The electromagnetic torque of the generator at the current moment is a ratio of the power of the frequency modulation at the current moment and the rotational speed at the current moment. The predicted next rotational speed after the predetermined time step is a sum of the rotational speed at the current moment and a result of weighting a difference between the aerodynamic mechanical torque at the current moment and the electromagnetic torque of the generator at the current moment by a predetermined weighting value. The predetermined weighting value is a ratio of the predetermined time step and the moment of inertia of the rotor. The prediction of the rotational speed can be realized via the following equation (1):

$$\omega[n+1] = \frac{T_s}{J} \cdot (\tau_{aero}[n] - \tau_{gen}[n]) + \omega[n] \quad (1)$$

where $\omega[n+1]$ is the rotational speed at the next moment, Ts is the predetermined time step, J is the moment of inertia of the rotor, $\tau_{aero}[n]$ is the aerodynamic mechanical torque at the current moment, $\tau_{gen}[n]$ is the electromagnetic torque of the generator at the current moment, ω(n) is the rotational speed at the current moment.

In an embodiment, the aerodynamic mechanical torque at the current moment $\tau_{aero}[n]$ and the electromagnetic torque of the generator at the current moment $\tau_{gen}[n]$ can be determined based on the rotational speed at the current moment ω(n). For example, it may be determined based on following equations (2) and (3):

$$\tau_{gen}[n] = \frac{P_{boost}[n]}{\omega[n]} \quad (2)$$

where $P_{boost}[n]$ is the frequency modulation power at the current moment, $$\tau_{aero}[n] = \frac{0.5 \cdot \rho \cdot AC_p(\lambda[n], \beta[n]) \cdot v^3}{\omega[n]} \quad (3)$$

where ρ is an air density, Ts is an impeller surface swept area of the wind turbine, $C_p$ is a wind energy coefficient, λ[N] is a tip speed ratio at the current moment, β[n] is a pitch angle at the current moment, v is an effective wind speed.

In an embodiment, the tip speed ratio at the current moment and the pitch angle at the current moment can be determined based on various existing schemes. For example, they can be determined based on the rotational speed at the current moment ω(n), which is not repeated herein. It can be understood that equations (2) and (3) are just exemplary. The aerodynamic mechanical torque at the current moment $\tau_{aero}[n]$ and the electromagnetic torque of the generator at the current moment $\tau_{gen}[n]$ can be determined based on other schemes.

In an embodiment, the rotational speed at the current moment, the aerodynamic mechanical torque of the wind turbine at the current moment, and the generator electromagnetic torque of the wind turbine at the current moment used for predicting the rotational speed after a first predetermined time step (here, n=1) are measured values;

the rotational speed at the current moment, the aerodynamic mechanical torque at the current moment, and the generator electromagnetic torque at the current moment used for predicting the rotational speed after a $n^{th}$ predetermined time step (here, n is a natural number greater than 1) are obtained based on the predicted rotational speed after a $n-1^{th}$ predetermined time step.

In step S120, frequency modulation remaining time is determined based on the predicted rotational speed. The frequency modulation remaining time is time for which the wind turbine is able to continue to output frequency modulation power as the output power used for the primary frequency modulation without affecting the recovery of the wind turbine after the primary frequency modulation.

Specifically, it is determined whether the predicted rotational speed satisfies a predetermined condition each time the rotational speed is predicted: the number of predetermined time steps that have passed (i.e., the number of times of iterations till the rotational speed has been predicted) is determined when any one of the predicted rotational speeds satisfies the predetermined condition; and a product of the number and the predetermined time step is calculated as the frequency modulation remaining time.

In an embodiment, the predetermined condition is that the aerodynamic mechanical torque of the wind turbine determined based on any one of the predicted rotational speeds is larger than a ratio of a lowest output power weighted by a predetermined factor and the any one of the predicted rotational speeds. The lowest output power is the minimum output power allowed in a recovery process of the wind turbine after the primary frequency modulation. For example, the condition can be expressed as the following in equation (4):

$$\tau_{aero}[n+1] > \gamma \cdot \frac{P_{rec}}{\omega[n+1]} \quad (4)$$

where $\tau_{aero}[n+1]$ is the aerodynamic mechanical torque of the wind turbine determined based on the predicted rotational speed, $\omega[n+1]$ is the rotational speed, $\gamma$ is the predetermined factor, $P_{rec}$ is the lowest output power.

A detailed flowchart of an example of determining the frequency modulation remaining time via steps S110 and S120 will be described hereinafter based on FIG. 2.

Figure 2:
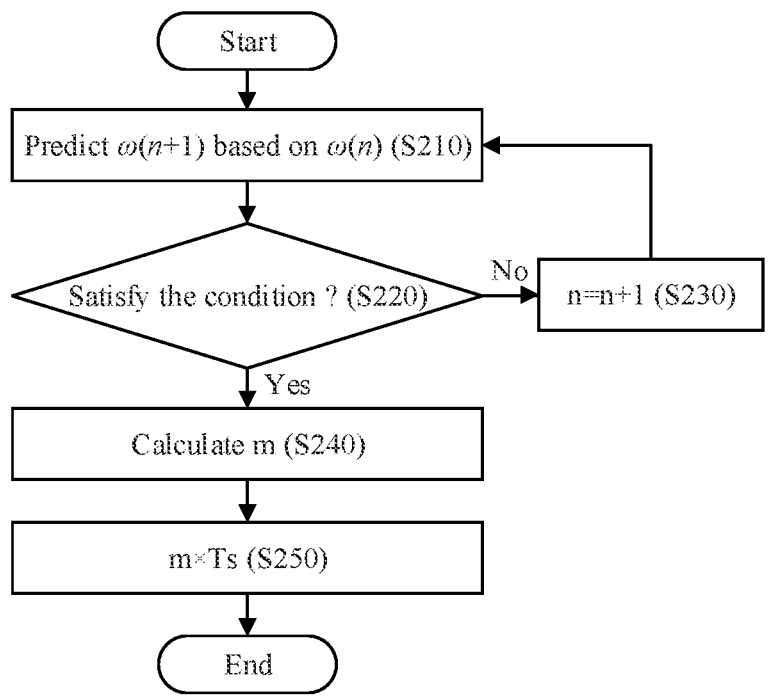
FIG. 2 is a flowchart of a method of determining frequency modulation remaining time according to an embodiment of the present disclosure.

FIG. 2 is a flowchart of a method of determining frequency modulation remaining time according to an embodiment of the present disclosure.

In step S210, the rotational speed $\omega(n+1)$ of the wind turbine at the next moment $T(n+1)$ is predicted based on the rotational speed $\omega(n)$ of the wind turbine at the current moment $T(n)$.

In step S220, it is determined whether the rotational speed $\omega(n+1)$ satisfies the predetermined condition.

When it is determined the rotational speed $\omega(n+1)$ does not satisfy the predetermined condition, in step S230, make n=n+1, and return to step S210, to predict the rotational speed at the next moment by using the latest predicted rotational speed.

When it is determined the rotational speed $\omega(n+1)$ satisfy the predetermined condition, in step S240, a sum of 1 and a difference between a current value of n and an original value of n is determined, to obtain the number m of predetermined time steps that have passed.

In step S250, a product of the number m and the predetermined time step Ts is calculated, as the frequency modulation remaining time.

The steps S110 and S120 can be executed periodically during the power boost of the primary frequency modulation, to provide the latest prediction data for subsequent steps.

In step S130, the output power is controlled based on the determined frequency modulation remaining time.

In an embodiment, the step of controlling the output power based on the determined frequency modulation remaining time includes stopping boosting the output power before the frequency modulation remaining time falls to a preset value. For example, it may stop the primary frequency modulation, or restore the output power from the frequency modulation power to output power before the primary frequency modulation. Herein, the preset value can be a time length larger than or equal to zero.

In an embodiment, the step of controlling the output power based on the determined frequency modulation remaining time includes adjusting the frequency modulation power, so that the determined frequency modulation remaining time is as close as possible to remaining frequency modulation time required by the primary frequency modulation. The frequency modulation power can be adjusted periodically at a predetermined time interval $T_{in}$. In an embodiment, the frequency of adjusting the frequency modulation power can be the sampling frequency of the controller of the wind turbine, such as 50 Hz. Here, the predetermined time interval $T_{in}$ is 1/50 second.

Figure 3:
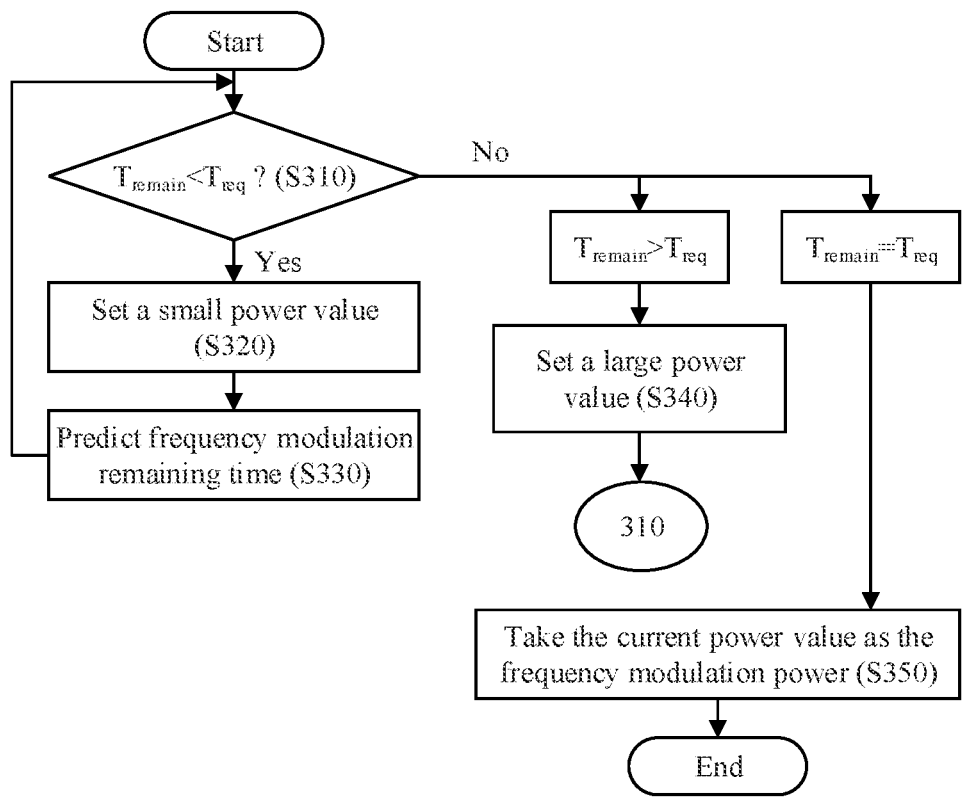
FIG. 3 is a flowchart of a method of controlling the output power based on the determined frequency modulation remaining time according to an embodiment of the present disclosure.

Reference is made to FIG. 3, which is a flowchart of a method of controlling the output power based on the determined frequency modulation remaining time according to an embodiment of the present disclosure.

As shown in FIG. 3, in step S310, it is determined whether the determined frequency modulation remaining time $T_{remain}$ is smaller than the remaining frequency modulation time $T_{req}$ required by the primary frequency modulation.

The remaining frequency modulation time $T_{req}$ required by the primary frequency modulation refers to time required to continue output the frequency modulation power to complete the primary frequency modulation.

If it is determined that the determined frequency modulation remaining time $T_{remain}$ is smaller than the remaining frequency modulation time $T_{req}$ required by the primary frequency modulation in step S310, a power value smaller than current frequency modulation power is set in step S320.

In step S330, in case that the set power value is the frequency modulation power, the rotational speed of the wind turbine is predicted again, the frequency modulation remaining time is determined again based on the rotational speed predicted again, and then the step 310 is returned to.

The rotational speed of the wind turbine can be predicted again and the frequency modulation remaining time can be determined again based on steps S110 and S120. During this period, the set power value is taken as the frequency modulation power at the current moment.

If it is determined that the determined frequency modulation remaining time is larger than the remaining frequency modulation time required for the primary frequency modulation in step S310, a power value lager than the current frequency modulation power is set in step S340, and the step 330 is returned to.

If it is determined that the determined frequency modulation remaining time is equal to the remaining frequency modulation time required for the primary frequency modulation in step S310, the current power value is taken as the frequency modulation power in step S350.

In an embodiment, in the method shown in FIG. 2, a reduction ratio of a power value set for the first time, which is smaller than the current frequency modulation power, is larger than a reduction ratio of a power value set after the first time, which is also smaller than the current frequency modulation power; and an increase ratio of a power value set for the first time, which is larger than the current frequency modulation power, is larger than an increase ratio of a power value set after the first time, which is also larger than the current frequency modulation power.

For example, the power value set for the first time, which is smaller than the current frequency modulation power $P_{boost}$ can be expressed as $P_{boost} \times (100\% - \Delta_{iter})$; the power value set after the first time, which is also smaller than the current frequency modulation power can be expressed as $P_{boost} \times (100\% - \Delta_{iter}/2)$. The power value set for the first time, which is larger than the current frequency modulation power can be expressed as $P_{boost} \times (100\% + \Delta_{iter})$; the power value set after the first time, which is also larger than the current frequency modulation power can be expressed as $P_{boost} \times (100\% + \Delta_{iter}/2)$. $\Delta_{iter}$ is a positive value.

In addition, when the frequency modulation remaining time determined at end of the predetermined time interval is not equal to the remaining frequency modulation time required by the primary frequency modulation, a power value set for the last time is taken as the frequency modulation power.

In an embodiment, in the present disclosure, the predetermined time interval $T_{in}$ is smaller than the predetermined time step Ts. In this case, there is no need to predict the frequency modulation remaining time for each adjustment of the frequency modulation power over time, which reduces a computational load.

Figure 4:
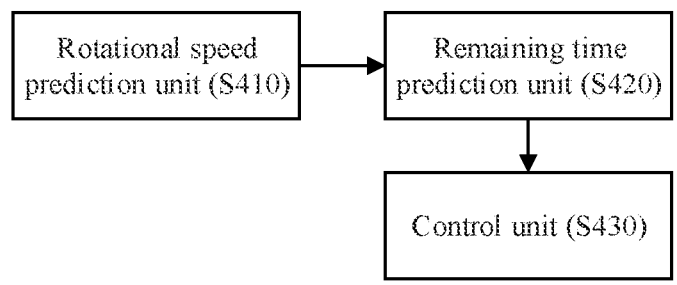
FIG. 4 is a block diagram of a device for controlling output power in a primary frequency modulation process of a wind turbine according to an embodiment of the present disclosure.

FIG. 4 is a block diagram of a device for controlling output power in a primary frequency modulation process of a wind turbine according to an embodiment of the present disclosure.

As shown in FIG. 4, the device 400 for controlling output power in a primary frequency modulation process of a wind turbine according to the embodiment of the present disclosure includes a rotational speed prediction unit 410, a remaining time prediction unit 420, and a control unit 430.

The rotational speed prediction unit 410 is configured to predict a rotational speed of the wind turbine. In an embodiment of the present disclosure, the rotational speed prediction unit 410 is configured to predict a next rotational speed of the wind turbine at a next moment by using a rotational speed of the wind turbine at a current moment and a frequency modulation power at the current moment iteratively. The next moment is separated from the current moment by a predetermined time step. In an embodiment, rotational speeds at moments separated by a predetermined time step are predicted. Two moments corresponding to two adjacent predicted rotational speeds are separated by the predetermined time step. For a situation of predicting rotational speeds of two adjacent moments, the two moments are separated by the predetermined time step. For example, in two adjacent predictions of rotational speeds, the rotational speed ω(n) at the current moment T(n) and the rotational speed ω(n+1) at the next moment T(n+1) are predicted. T(n+1)−T(n) is Ts (Ts is the predetermined time step).

In an embodiment of the present disclosure, a next rotational speed after the predetermined time step can be predicted based on the rotational speed at the current moment, the aerodynamic mechanical torque at the current moment, the electromagnetic torque of the generator at the current moment related to the frequency modulation power at the current moment, the predetermined time step, and the moment of inertia of the rotor. The electromagnetic torque of the generator at the current moment is a ratio of the power of the frequency modulation at the current moment and the rotational speed at the current moment. The predicted next rotational speed after the predetermined time step is a sum of the rotational speed at the current moment and a result of weighting a difference between the aerodynamic mechanical torque at the current moment and the electromagnetic torque of the generator at the current moment by a ratio of the predetermined time step and the moment of inertia of the rotor. The prediction of the rotational speed can be realized via the above equation (1).

The remaining time prediction unit 120 is configured to determine frequency modulation remaining time based on the predicted rotational speed. The frequency modulation remaining time is time for which the wind turbine is able to continue to output frequency modulation power as the output power used for the primary frequency modulation without affecting a recovery of the wind turbine after the primary frequency modulation.

In an embodiment, the remaining time prediction unit 120 is configured to determine whether the predicted rotational speed satisfies a predetermined condition each time the rotational speed is predicted; determine the number of predetermined time steps that have passed (i.e., the number of times of iterations till the rotational speed has been predicted) when any one of the predicted rotational speeds satisfies the predetermined condition; and calculates a product of the number and the predetermined time step as the frequency modulation remaining time.

In an embodiment, the predetermined condition is that the aerodynamic mechanical torque of the wind turbine determined based on any one of the predicted rotational speeds is larger than a ratio of a lowest output power weighted by a predetermined factor and the any one of the predicted rotational speeds. The lowest output power is the minimum output power allowed in a recovery process of the wind turbine after the primary frequency modulation. For example, the condition can be expressed as the above in equation (4).

In an embodiment, an example of determining the frequency modulation remaining time illustrated in FIG. 2 can be executed by the rotational speed prediction unit 410 in conjunction with the remaining time prediction unit 420.

The control unit 430 is configured to control the output power based on the determined frequency modulation remaining time.

In an embodiment, the control unit 430 is configured to stop boosting the output power before the frequency modulation remaining time falls to a preset value. For example, it may stop the primary frequency modulation, or restore the output power from the frequency modulation power to output power before the primary frequency modulation. Herein, the preset value can be a time length larger than or equal to zero.

In an embodiment, the control unit 430 is configured to adjust the frequency modulation power, so that the determined frequency modulation remaining time is as close as possible to remaining frequency modulation time required by the primary frequency modulation. The frequency modulation power can be adjusted periodically at a predetermined time interval $T_{in}$. For example, the control unit 430 can adjust the frequency modulation power based on a way illustrated in FIG. 3.

A control system in a wind turbine is provided according to an embodiment of the present disclosure. The control system includes a processor and a memory. The memory is configured to store computer readable codes, instructions, or programs. The method for controlling output power in a primary frequency modulation process of a wind turbine according to the embodiments of the present disclosure is executed when the computer readable codes, instructions, or programs are executed by the processor.

In addition, it should be understood that the units of the device according to the embodiments of the present disclosure can be implemented as hardware modules and/or software modules. Those skilled in the art can implement the units based on the processes executed by the units, for example, by using a field programmable gate array (FPGA) or an application-specific integrated circuit (ASIC).

In addition, the method according to the embodiments of the present disclosure can be implemented as computer codes in a computer readable storage medium. Those skilled in the art can implement the computer codes according to the description of the above method. The above method of the present disclosure can be implemented when the computer codes are executed in a computer.

Although the present disclosure is shown and described specifically with reference to its exemplary embodiments, it should be understood by those skilled in the art that various changes in form and detail may be made to the present disclosure without departing from the principle and scope of the present disclosure.

The invention claimed is:

1. A method for controlling an output power of a wind turbine, comprising:
    predicting a plurality of rotation speeds of the wind turbine, each of the plurality of rotation speeds corresponding to a respective future moment;
    responsive to predicting each new rotation speed in the plurality of rotation speeds, determining whether the newly predicted rotation speed satisfies a predetermined condition; and responsive to determining that the newly predicted rotation speed satisfies the predetermined condition:
  determining a frequency modulation remaining time corresponding to the newly predicted rotation speed; and
  controlling the output power of the wind turbine based on the frequency modulation remaining time.

2. The method of claim 1, wherein the predetermined condition comprises a condition that an aerodynamic mechanical torque of the wind turbine corresponding to the newly predicted rotation speed is larger than a threshold.

3. The method of claim 2, further comprising determining the threshold based on at least one of the newly predicted rotation speed or a minimum output power allowed in a recovery process of the wind turbine after a primary frequency modulation.

4. The method of claim 2, further comprising determining the aerodynamic mechanical torque based on the newly predicted rotation speed.

5. The method of claim 4, wherein the aerodynamic mechanical torque is determined further based on at least one of an air density, an impeller surface swept area of the wind turbine, a wind energy coefficient, a tip speed ratio at a future moment when the newly predicted rotation speed is predicted, a pitch angle at the future moment when the newly predicted rotation speed is predicted, or an effective wind speed.

6. The method of claim 1, wherein determining the frequency modulation remaining time corresponding to the newly predicted rotation speed comprises:
  determining a total number of predetermined time steps between an original time point moment and a future moment when the newly predicted rotation speed is predicted; and
  calculating the frequency modulation remaining time as a multiplicative product of the total number of predetermined time steps and a step size of each predetermined time step.

7. The method of claim 1, wherein controlling the output power of the wind turbine based on the frequency modulation remaining time comprises:
  comparing the frequency modulation remaining time with a remaining frequency modulation time associated with a primary frequency modulation to generate a comparison result, wherein the remaining frequency modulation time represents a time duration to continue outputting a frequency modulation power so that the primary frequency modulation is completed; and
  controlling the output power of the wind turbine based on the comparison result.

8. The method of claim 7, wherein controlling the output power of the wind turbine based on the comparison result comprises:
  selecting a power value that is smaller than a value of the frequency modulation power based on the comparison result;
  changing the value of the frequency modulation power to be the power value;
  determining another frequency modulation remaining time corresponding to another newly predicted rotation speed in the plurality of rotation speeds that also satisfies the predetermined condition; and
  controlling the output power of the wind turbine based on the other frequency modulation remaining time.

9. The method of claim 7, wherein controlling the output power of the wind turbine based on the comparison result comprises:
  selecting a power value that is greater than a value of the frequency modulation power based on the comparison result;
  changing the value of the frequency modulation power to be the power value;
  determining another frequency modulation remaining time corresponding to another newly predicted rotation speed in the plurality of rotation speeds that also satisfies the predetermined condition; and
  controlling the output power of the wind turbine based on the other frequency modulation remaining time.

10. The method of claim 7, wherein controlling the output power of the wind turbine based on the comparison result comprises:
  changing a value of the frequency modulation power to be a current power value of the wind turbine based on the comparison result.

11. The method of claim 1, further comprising:
  responsive to determining that the newly predicted rotation speed does not satisfy the predetermined condition, predicting a next rotation speed in the plurality of rotation speeds based on the newly predicted rotation speed.

12. The method of claim 11, wherein the next rotation speed in the plurality of rotation speeds is predicted further based on an aerodynamic mechanical torque at a future moment when the newly predicted rotation speed is predicted and a generator electromagnetic torque at the future moment when the newly predicted rotation speed is predicted.

13. The method of claim 12, further comprising:
  determining the aerodynamic mechanical torque and the generator electromagnetic torque at the future moment when the newly predicted rotation speed is predicted based on the newly predicted rotation speed.

14. A system for controlling an output power of a wind turbine, comprising:
  a memory configured to store instructions; and
  a processor configured to execute the instructions to perform operations, the operations comprising:
    predicting a plurality of rotation speeds of the wind turbine, each of the plurality of rotation speeds corresponding to a respective future moment;
    responsive to predicting each new rotation speed in the plurality of rotation speeds, determining whether the newly predicted rotation speed satisfies a predetermined condition; and
    responsive to determining that the newly predicted rotation speed satisfies the predetermined condition:
      determining a frequency modulation remaining time corresponding to the newly predicted rotation speed; and
      controlling the output power of the wind turbine based on the frequency modulation remaining time.

15. The system of claim 14, wherein the predetermined condition comprises a condition that an aerodynamic mechanical torque of the wind turbine corresponding to the newly predicted rotation speed is larger than a threshold.

16. The system of claim 15, wherein the operations further comprise:
  determining the threshold based on the newly predicted rotation speed and a minimum output power allowed in a recovery process of the wind turbine after a primary frequency modulation; and
  determining the aerodynamic mechanical torque based on the newly predicted rotation speed.

17. The system of claim 14, wherein to determine the frequency modulation remaining time corresponding to the newly predicted rotation speed, the operations further comprise:
  determining a total number of predetermined time steps between an original moment and a future moment when the newly predicted rotation speed is predicted; and
  calculating the frequency modulation remaining time as a multiplicative product of the total number of predetermined time steps and a step size of each predetermined time step.

18. The system of claim 14, wherein to control the output power of the wind turbine based on the frequency modulation remaining time, the operations further comprise:
  comparing the frequency modulation remaining time with a remaining frequency modulation time associated with a primary frequency modulation to generate a comparison result, wherein the remaining frequency modulation time represents a time duration to continue outputting a frequency modulation power so that the primary frequency modulation is completed; and
  controlling the output power of the wind turbine based on the comparison result.

19. The system of claim 18, wherein to control the output power of the wind turbine based on the comparison result, the operations further comprise:
  selecting a power value that is smaller than a value of the frequency modulation power based on the comparison result;
  changing the value of the frequency modulation power to be the power value;
  determining another frequency modulation remaining time corresponding to another newly predicted rotation speed in the plurality of rotation speeds that also satisfies the predetermined condition; and
  controlling the output power of the wind turbine based on the other frequency modulation remaining time.

20. A non-transitory computer-readable storage medium configured to store instructions which, when executed by a processor, cause the processor to perform a method to control an output power of a wind turbine, the method comprising:
  predicting a plurality of rotation speeds of the wind turbine, each of the plurality of rotation speeds corresponding to a respective future moment;
  responsive to predicting each new rotation speed in the plurality of rotation speeds, determining whether the newly predicted rotation speed satisfies a predetermined condition; and
  responsive to determining that the newly predicted rotation speed satisfies the predetermined condition:
    determining a frequency modulation remaining time corresponding to the newly predicted rotation speed; and
    controlling the output power of the wind turbine based on the frequency modulation remaining time.

* * * * *